Nov. 6, 1951     J. T. MARVIN ET AL     2,574,220
APPARATUS FOR FROTHING RUBBER-LIKE MATERIAL

Original Filed Jan. 30, 1947     2 SHEETS—SHEET 1

INVENTORS
JOHN T. MARVIN
GEORGE H. McFADDEN
BY *Spencer Hardman & John*
THEIR ATTORNEYS INVENTORS
JOHN T. MARVIN
GEORGE H. McFADDEN
BY
THEIR ATTORNEYS Patented Nov. 6, 1951

2,574,220

UNITED STATES PATENT OFFICE 2,574,220

APPARATUS FOR FROTHING RUBBERLIKE MATERIAL

John T. Marvin, Dayton, and George H. McFadden, Columbus, Ohio, assignors, by direct and mesne assignments, to General Motors Corporation, Detroit, Mich., a corporation of Delaware Original application January 30, 1947, Serial No. 725,379, now Patent No. 2,475,191, dated July 5, 1949. Divided and this application June 4, 1949, Serial No. 97,216

3 Claims. (Cl. 259—64)

This application is a division of Serial No. 725,379, filed January 30, 1947, Patented July 5, 1949, No. 2,475,191.

This invention relates to the aeration of viscous liquids and is particularly concerned with improved methods for controlling the aeration of aqueous dispersions of butalastic polymers.

Butalastic polymers are herein defined as any polymer, natural or synthetic, which includes a conjugated diene radical, such as, butadienes, substituted butadienes, etc.

It is, therefore, an object of the invention to provide a method for aerating aqueous dispersions of butalastic polymers, such as, natural rubber or synthetic rubber dispersions or latices, into a froth wherein the size of the air bubbles will be controlled and wherein the froth is of a stable character due to controlled beating speed.

In accordance with the above object, it is a further object to provide a continuous method for foaming or frothing aqueous dispersions of butalastic polymers wherein a plurality of beaters are utilized, each of which operates at a progressively different and increased speed whereby the size of the air bubbles in the foam may be closely controlled in the various frothing tanks used in connection with the beaters.

A still further object of the invention is to provide a method for aerating an aqueous dispersion of a butalastic polymer wherein an aqueous dispersion is frothed or foamed through beating operations wherein the beaters operate at progressively greater speeds whereby the bubble size of the dispersion may be controlled and changed through a desirable range of sizes so that the final foamed dispersion will have small sized air bubbles and be stable in character.

We have discovered that in the frothing or foaming of aqueous dispersions of butalastic polymers, such as, rubber latex, etc., control of the beater speeds has a marked effect on the type of foam produced. In this connection, it is desirable to create relatively large bubbles in the early stages of the beating which will be gradually reduced in size through the beating process so that small sized bubbles are present in the final foam which tends towards increasing the stability of the foam. Various apparatuses have been used in the past in order to obtain this small bubble size in the foam but so far as we are aware, no satisfactory continuous method has ever been proposed nor have the prior methods been of a type which lend themselves to close control of the foam or to continuous or semi-continuous operation. The present invention is directed to a method and apparatus for foaming aqueous dispersions wherein the bubble size of the foam may be closely controlled and will be progressively decreased with attendant volumetric increase until such time as the foam has the desired bubble size and volume and is of such character that said operations may be carried out in a continuous, semi-continuous or batch process as desired.

Further objects and advantages of the present invention will be apparent from the following description, reference being had to the accompanying drawings, wherein preferred embodiments of the present invention are clearly shown.

In the foaming or frothing of butalastic polymer dispersions, the froth or foam is produced by aeration of the liquid usually through use of a squirrel cage beater or the like, wherein vast quantities of air are introduced into the liquid to produce a foam or froth. This air, as it is beaten into the liquid, tends to produce bubbles of relatively large size and these bubbles are obviously of a rather unstable nature, therefore, if a froth including large bubbles were used in the manufacture of sponge rubber articles, it is apparent that the froth would be highly unstable and would break down in the molds so that completely filled molds would be almost impossible to obtain. It has been found that a relatively small bubble size of the aerated foam has greater stability and is therefore more desirable in the molding of articles from foamed dispersions.

In the past, control of the air bubble size in the foam was difficult to obtain and, so far as we are aware, the only method known was one in which beaters were immersed at different depths within the dispersion whereby different levels of the dispersion were frothed progressively. This method has several obvious disadvantages, the main one being, that the entire batch used in the first beating chamber is only partially aerated at the top thereof.

Our improved method for the aeration of aqueous dispersions proposes the use of a plurality of beaters which operate at progressively increased speeds whereby a large air bubble size is first obtained which bubble size is progressively broken down in the several stages of the process to a controlled small bubble size of a maximum stability.

For the sake of clarity, the use of the term "latex" hereinafter is to be understood to include any butalastic polymer dispersion, such as, dispersions or latices of natural rubber, polychloroprene, butadienestyrene copolymers, acrylonitrile, butadiene copolymers, polyisoprene and, in fact, any dispersion which falls within the class of conjugated diolefin polymers.

Figure 1:
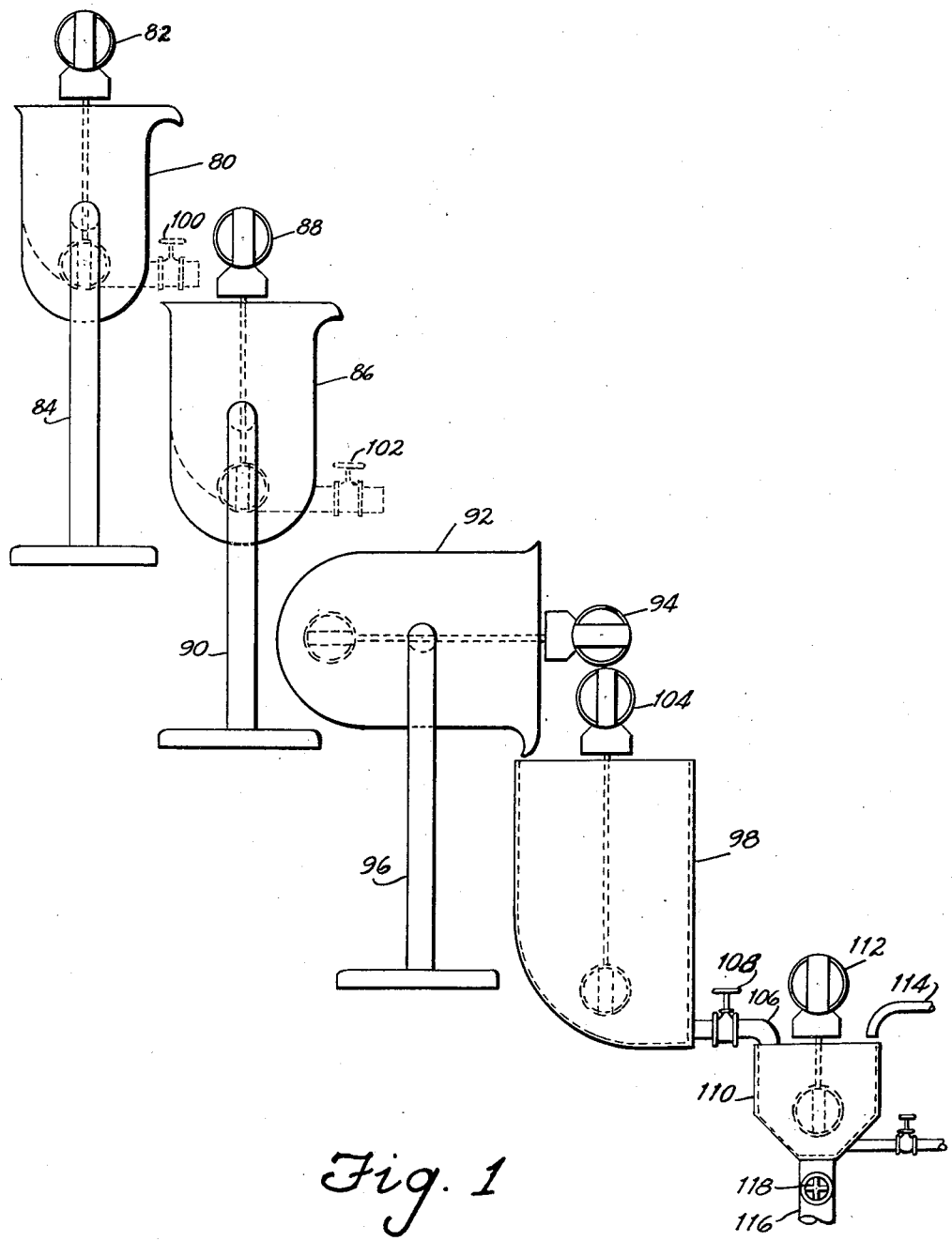
Fig. 1 is a diagrammatic view of another type of apparatus for continuous or semi-continuous foaming of aqueous dispersions.

An embodiment of the invention is shown in Fig. 1, wherein another type of aparatus is utilized to accomplish the same end, namely, that of foaming the latex. In Fig. 1, a plurality of tanks are shown wherein tank 80 is the initial mixing chamber for the latex. The latex may or may not be compounded as desired, or it may be compounded by the addition of compounding ingredients at any of the subsequent steps in the process. The tank 80 is supplied with a mixer 82 and is preferably tiltably supported on a support 84. After a predetermined time of mixing, during which period, air is beaten into the latex to form large bubbles, the tank 80 is tilted on the support 84 and the contents poured into a second tank 86 also supplied with a mixer or beater 88. Tank 86 is tiltably supported on support 90. After another period of aeration, the tank 86 is tilted to pour its contents into a third tank 92 supplied with a mixer 94 and tiltably supported on support 96. Tank 92 in the drawing, Fig. 1, is shown in a tilted position wherein the contents is being poured into storage tank 98. In place of tilting tanks, valved bottom outlets may be supplied for the tanks as shown in the dotted lines at 100 and 102 in connection with tanks 80 and 86. In this case, the beaten latex is removed from the bottom of the tanks rather than being poured therefrom. Obviously, any means of transferring the latex from one tank to the other comes within the scope of this invention.

Storage tank 98 is larger than any of the other tanks. Tank 98 is also supplied with a beater 104 and a bottom outlet 106 which is valved at 108 and communicates with a smaller tank 110 also equipped with a beater 112 wherein the gelling agent may be added through a pipe 114. The tank 110 may be emptied directly into molds through a bottom outlet 116 which is valved at 118 or by other suitable means.

In practice, squirrel cage type beaters are utilized which operate on a planetary system. One such beater is sold on the market under the name of the "Hobart Mixer" which is a planetary type mixer having a planetary rotation of about ½ the speed of the rotation of the beater. In one example, the beater in tank 80 will operate at about 100 R. P. M. with 50 R. P. M. planetary rotation, whereas the beater 88 in tank 86 will be operated at approximately 200 R. P. M. with a 100 R. P. M. planetary rotation whereas the beater 94 in tank 92 will be operated at approximately 400 R. P. M. with between 150 and 200 R. P. M. planetary rotational speed. In this connection, the beater in the storage tank is preferably operated at a speed slightly less than the last foaming tank beater to prevent further increase in foam volume and, therefore, we recommend speeds between 350 and 375 R. P. M. with a corresponding planetary rotational speed. The beater 112 in the tank 110 operates at a speed the same or slightly greater than the last foaming tank beater speed and, in this connection, the beater 112 should operate around 400-425 R. P. M.

The first beater step conditions the latex for foaming by "creaming" the dispersion. This does create a marked increase in volume and nothing approximating the increase experienced in the last two tanks.

It will be noted that the tanks 80, 86 and 92 are of progressively larger size to take care of the increased volume of the latex as it becomes aerated. Each successive tank should be approximately two times the volume of the preceding tank when three chambers are utilized with the above beater speeds, and in this connection, the final storage tank 98 should be about twice as large as the last aerating tank. The size of the gelling tank 110 is controlled by the number of molds which are desired to be filled from one batch of the latex.

All of the speeds noted herein and suggested volumes of tanks are obviously abritrary and depend very much on the number of steps utilized. The suggested size ratio of tanks and speed of beaters therein, is given for a three-stage process. We have found that the latex will not increase very greatly in volume during the beating in tank 80 wherein the latex is beaten at a rather slow speed, which beating may be called the "creaming" step. Thus the tank 80 may be charged about three quarters full. The latex, after being transferred to tank 86, will increase two times its original volume and, therefore, tank 86 should be about twice the size of tank 80 to accommodate this change. Tank 92, after being transferred will again increase about twice its volume so this tank should be about twice as large as the preceding tank 86 etc. As herebefore stated the number of beating steps and progressive increase in beating speeds has much to do with the volume increase in the various tanks and, therefore, the figures given are illustrative only of a three step process at approximately the beating speeds set forth.

This tremendous change in volume due to aeration of the latex, is one of the controlling factors for the success of this invention. By using successive tanks of increasing size, it is possible for the beaters to operate at substantially full efficiency, in all cases, since the level of the latex initially charged is always approximately the same due to the changing volume of the tanks. This is one fact which makes the beating of latex by means of a variable speed beater in a single tank rather difficult to accomplish and inefficient since the tank must be large enough to hold the final volume of the latex and thus only a very small quantity may be charged therein which means that the beater is not operating at anything approximating its full efficiency until the volume of the latex has greatly increased due to aeration. This requires longer times for the mixing which often causes premature coagulation of the latex, or a runny condition thereof wherein frothing is difficult to obtain. Similarly if the latex is beaten at the high speed first, premature coagulation may possibly result whereas the gradual increase in beating speeds used in the present invention prevents any such contingency from arising.

It is obvious from these statements that the more tanks utilized in the steps of beating, the greater the efficiency of the set-up since the change in volume in each tank will be relatively less which means that the beater will be operating in a more constant depth of liquid or froth which is a desirable condition. However, for practical purposes in production, three beater chambers or tanks yield satisfactory results, as set forth herein.

Figure 2:
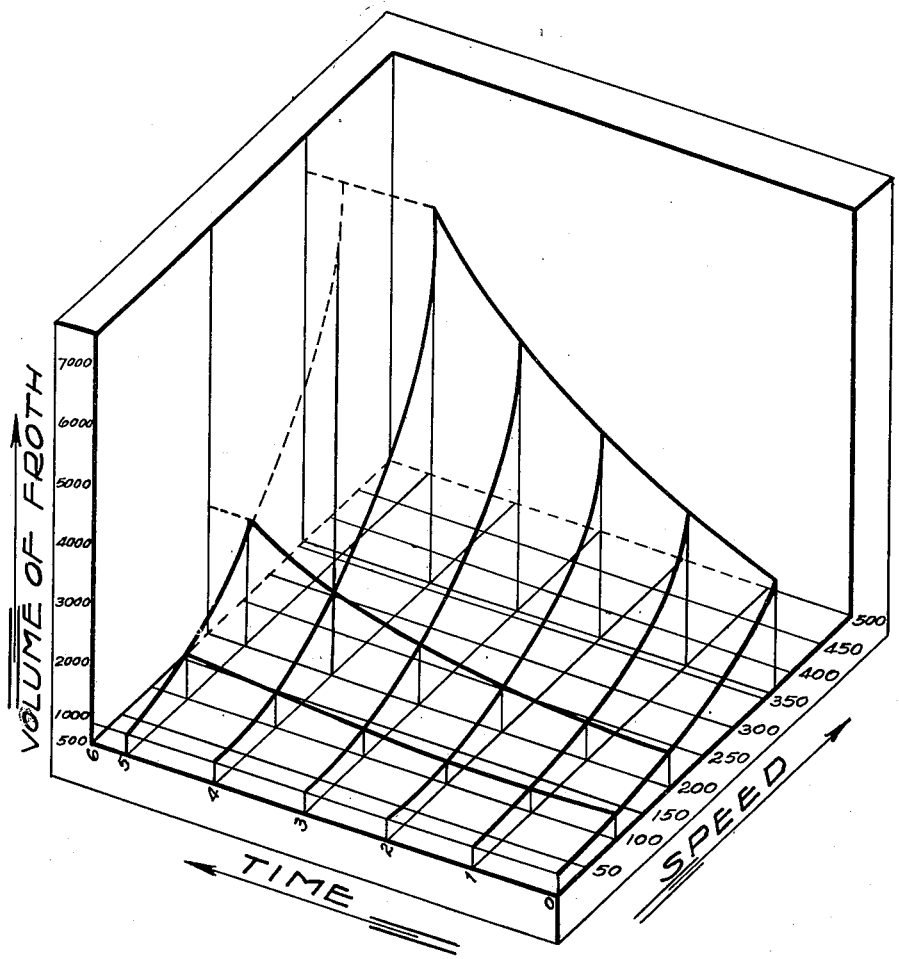
Fig. 2 is a three dimenisonal chart showing effect of speed and time on foam height.

Fig. 2 is a three dimensional chart showing actual results obtained in beating latex to a foam in a three-step process, the speeds utilized being approximately 100, 200 and 360 R. P. M. The chart shows that the latex is first beaten for six minutes at 100 R. P. M., the speed is then increased to 200 R. P. M. for a period of five minutes after which the same frothed latex is beaten at 360 R. P. M. for four minutes. Thus the actual foaming of the latex takes place over a period of 15 minutes during which time the volume thereof increases approximately seven times. The foam obtained is highly stable, of small bubble size and very desirable for molding purposes.

From the foregoing it is apparent that we have provided a new method for continuously foaming butalastic copolymers in aqueous dispersions which gives a desirable foam of stable characteristics, small bubble size, which method through the specific steps used in the process is highly efficient throughout the beating periods whereby greater quantities of dispersions may be frothed to a desirable character foam in a minimum of time.

In some cases it may be desirable to furnish air or other satisfactory gaseous medium under pressure to one or more of the beating chambers to aid in the aeration of the latex and thus work in conjunction with the beater or beaters, such an expedient is understood to be within the scope of our invention.

While the embodiments of the present invention as herein disclosed, constitute preferred forms, it is to be understood that other forms might be adopted.

What is claimed is as follows:

1. Apparatus for foaming latex, comprising in combination; at least three separate individually tiltable containers in cascade arrangement wherein the highest container is the smallest and each succeeding lower container is progressively larger, said containers being arranged and spaced so that upon tilting thereof, the contents will flow into the next lower container; at least three separate beaters, one of which is associated with and carried entirely by each container and adapted to tilt with the container as a unit, each beater being adapted to rotate at a speed greater than the preceding beater wherein the ratio of the first to the last beater is in the order of about 1 to 4 with an initial speed of about 100 R. P. M., and a storage tank larger than any of said containers and positioned below the last mentioned container in the cascade arrangement.

2. Apparatus for foaming latex, comprising in combination; at least three separate individually tiltable containers in cascade arrangement, each succeeding lower container being approximately twice as large as the preceding container, said containers being arranged and spaced so that upon tilting thereof, the contents will flow into the next lower container; at least three separate beaters, one of which is associated with and carried entirely by each container and adapted to tilt with the container as a unit, each beater being adapted to rotate at a speed greater than the preceding beater wherein the ratio of the first to the last beater is in the order of about 1 to 4 with an initial speed of about 100 R. P. M., and a storage tank larger than any of said containers and positioned below the last mentioned container in the cascade arrangement.

3. Apparatus as claimed in claim 1, wherein each container includes a tiltable carriage for supporting said container.

JOHN T. MARVIN.
GEORGE H. McFADDEN.

REFERENCES CITED

The following references are of record in the file of this patent:

UNITED STATES PATENTS

| Number | Name | Date |
| --- | --- | --- |
| Re. 16,447 | Speidel | Oct. 26, 1926 |
| 1,158,126 | North | May 1, 1926 |
| 1,983,319 | Simpson | Dec. 4, 1934 |
| 2,324,988 | Greenup et al. | July 20, 1943 |